Figure 1:
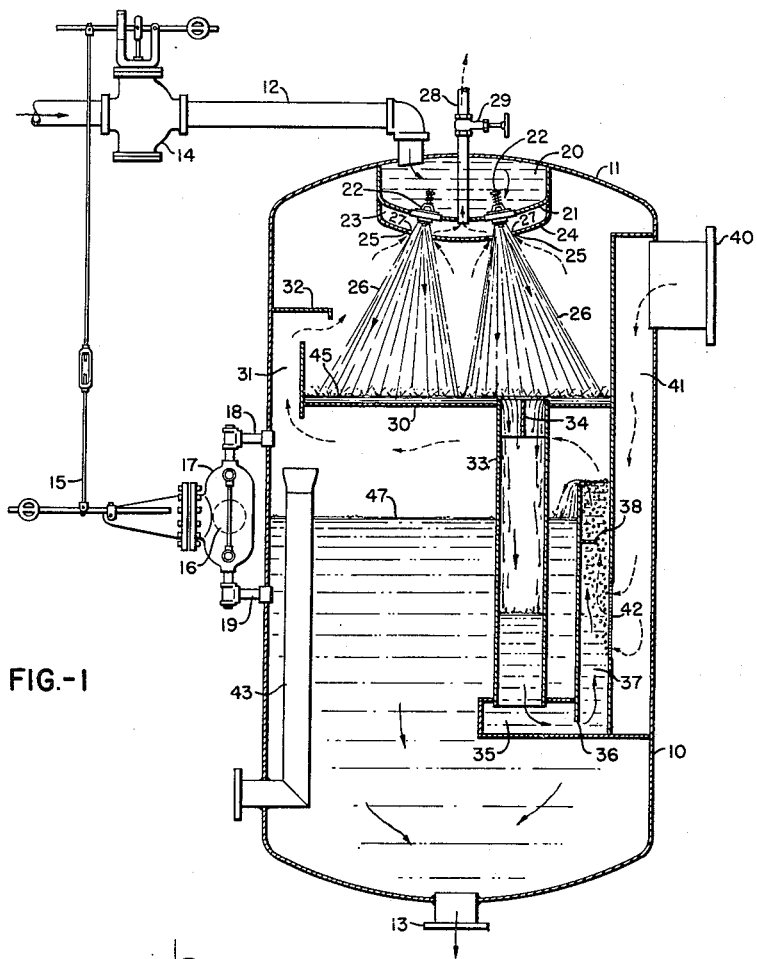

March 9, 1954     M. E. GILWOOD     2,671,524

WATER DEAERATING

Filed July 14, 1951

MARTIN E. GILWOOD
*INVENTOR.*

BY *Eric Pick*

ATTORNEY.

UNITED STATES PATENT OFFICE 2,671,524

WATER DEAERATING

Martin E. Gilwood, Hollis, N. Y., assignor to The Permutit Company, New York, N. Y., a corporation of Delaware Application July 14, 1951, Serial No. 236,733

8 Claims. (Cl. 183—2.5)

This invention relates to water deaerating; and it comprises deaerating apparatus having an enclosed tank, water inlet and outlet pipes and a steam inlet pipe, all connected with said tank, spraying means adapted to receive water from said water inlet pipe and to discharge said water downwardly in conically shaped flow, an enclosure in the upper portion of said tank enclosing said spraying means, aperture means in said enclosure co-axial with said conically shaped flow and providing an annular opening of uniform width surrounding said conically shaped flow, and a vent pipe connected with said enclosure; and my invention further comprises an improved method of treating water to deaerate it; all as more fully hereinafter set forth and as claimed.

In deaerating water for use in steam boilers and various other industrial purposes it has long been the practice to carry out the deaeration in several steps or stages. It has been customary to bring the incoming water into heat exchanging relationship with the outgoing incondensable gases in order to condense as much as possible of the steam mixed with the incondensable gases before venting them so as to reduce the heat loss to a minimum. Such heat exchange was brought about in one of several ways: either the vent was located in the vicinity of the cold water inlet; or the matter to be vented was withdrawn through a curtain formed by the incoming cold water in an attempt to condense the steam more effectively; or the incoming water and the outgoing gaseous matter were passed through a vent condenser in which water and gases were separated from each other by metal walls. All these arrangements leave much to be desired. Withdrawing the vented gases merely from the vicinity of the incoming water was inefficient and wasteful because substantial amounts of steam had to be vented with the incondensable gases in order to maintain the concentration of gases in the apparatus sufficiently low for effective deaeration. Withdrawing the gaseous matter to be vented through a curtain formed by the incoming water was less wasteful because the steam was condensed more effectively, but was still inefficient in that the passage through the curtain required an appreciable pressure differential so that steam had to be supplied to the apparatus at a higher pressure. The provision of a vent condenser with metal walls not only constituted an item of considerable first cost but also involved continuing maintenance and repair expenses. When the incoming water contains temporary hardness the heating of the water in the vent condenser results in scale formation on the heat exchange surfaces and such scale has to be removed periodically.

Another shortcoming of deaerating heaters has been susceptibility to corrosion. The incoming water on being heated, although giving up a substantial part of its oxygen content, is still highly corrosive and will rapidly damage metal surfaces, if it is allowed to impinge upon them, unless special corrosion-resistant but also quite expensive materials of construction are employed.

It is an object of this invention to provide a method and an apparatus for effectively condensing most of the steam mixed with the incondensable gases prior to venting them, and to attain this without appreciable pressure loss by simple means inexpensive in installation and not subject to maintenance difficulties.

Another object is to introduce the water in such manner that in its most corrosive stages it does not impinge on any metal surfaces so as to minimize corrosion and at the same time make unnecessary the employment of special corrosion-resistant materials of construction.

Figure 2:
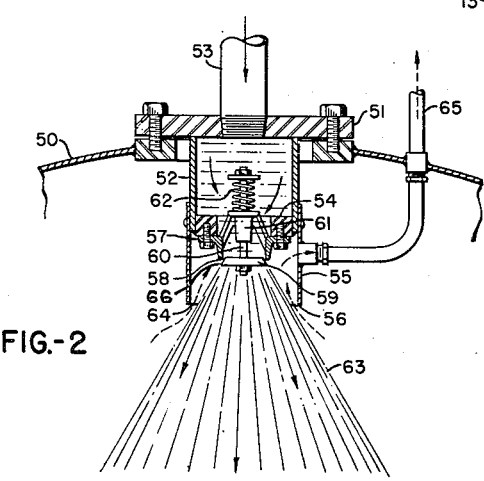

The manner in which the foregoing objects are achieved is shown in the accompanying drawings in which:

Fig. 1 is a view, partly in section, through an apparatus in accordance with my invention; and Fig. 2 is a fragmentary view, partly in section and on an enlarged scale, of a modification.

Referring now to Fig. 1 the apparatus comprises a tank 10 having a top 11 and provided with a water inlet 12 and a water outlet 13. In the water inlet 12 is provided a float valve 14 connected by linkages 15 with a float 16 which is free to rise and fall in a cage 17 connected with tank 10 by connections 18 and 19. On the underside of the tank top 11 is mounted a water inlet chamber 20 with which the water inlet 12 communicates and which has a dished bottom 21. On the bottom 21 are mounted spray valves 22 in such manner that they are located in an enclosure 23 which has a dished bottom 24 extending roughly parallel to bottom 21 and provided with apertures 25. Each of the spray valves 22 provides a conically shaped passage (the passage 66 shown in Fig. 2) adapted to discharge a conically shaped stream of water 26, and the apertures 25 are arranged co-axially with said passages and streams 26 but of such size that they provide annular openings 27 of uniform width, preferably less than one inch, surrounding an imaginary extension of said passages or the conically shaped streams 26, as shown. A vent 28 leads from the enclosure 23 to the atmosphere and is provided with a valve 29.

Below the enclosure 23 is provided a tray 30 on one side of which there is a passage 31 covered by a hood 32. From the tray 30 a pipe 33 provided with vortex breaking baffles 34 leads to a horizontal passage 35 having a baffle 36 and communicating with a scrubbing chamber 37 in which is arranged a baffle 38. A steam inlet 40 communicates with a steam chest 41, and a perforated plate 42 is provided to separate the steam chest 41 from the scrubbing chamber 37. An overflow 43 is provided in tank 10 which may be connected to a seal or trap in a known manner.

In order to facilitate understanding of the operation, the flow of water has been indicated by solid arrows whereas the flow of steam and gases has been indicated by broken arrows. The water enters through inlet pipe 12 into chamber 20 whence it is discharged by the spring loaded spray valves 22 in conically shaped streams 26. The water so being discharged is preheated by contact with steam filling the upper portion of tank 10 and then strikes the body of water 45 on tray 30 without previously coming in contact with any metal surfaces after having once left the spray valves 22. From the body 45 the water flows through vertical pipe 33, horizontal pipe 35 and around baffle 36 into the scrubbing chamber 37 where it mixes with steam entering through inlet 40, steam chest 41 and perforated plate 42. This particular arrangement of scrubbing chamber and associated parts forms the subject-matter of the Yoder Patent 2,241,873, dated May 13, 1941. The steam is supplied through inlet 40 in an excess over the quantity needed to heat the water in scrubbing chamber 37 to the boiling point so as to effect thorough deaeration. From the open top of the scrubbing chamber 37 the water overflows into the lower part of tank 10 where a level is maintained at 47 by the float 16 actuating float valve 14. The deaerated water is withdrawn through outlet 13. The uncondensed excess of steam released from the water at the top of the scrubbing chamber 37 passes through passage 31 and under hood 32 into the space above the tray 30. This steam, mixed with the incondensable gases, then passes without appreciable pressure loss through the narrow annular openings 27 in close proximity to the conically shaped streams of cold water 26. Through contact of the excess steam with the streams 26 in the upper portion of tank 10 and during the counter-current flow through openings 27 the water is heated to a temperature close to the boiling point while most of the excess steam is effectively condensed. The incondensable gases together with a relatively small remaining amount of uncondensed steam are vented from enclosure 23 via pipe 28 and valve 29.

Fig. 2 shows a modification employing but one spray valve which is adequate for deaerating apparatus serving relatively small needs. Fig. 2 has been shown on an enlarged scale so as to illustrate the construction of the spray valve more clearly. Bolted to the tank top 50 is a flange 51 which carries a water inlet chamber 52 with which water inlet 53 communicates. The water inlet chamber 52 is provided with a bottom 54 on which is mounted a spray valve, such as the valves 22 of Fig. 1, located in an enclosure 55 provided at its lower end with an aperture 56. The spray valve has a body 57 provided with a seat 58 on which is adapted to seat a conically shaped valve member 59. The valve member 59 is mounted on a shaft 60 which is guided in a bearing 61 formed in the body 57. A spring 62 tends to pull the valve member 59 against the seat 58. As water is supplied through pipe 53 into chamber 52 its pressure acting on valve member 59, overcomes the tension of spring 62 so that the valve member 59 moves down providing a conically shaped passage 66 discharging a conically shaped stream of water 63, as shown. While water is being supplied to chamber 52, the member 59 assumes a position in which the pressure differential of the water in its passage between seat 58 and member 59, acting on valve member 59, equals the tension of spring 62. An annular opening 64 is again provided which surrounds an imaginary extension of passages 66 and the stream 63 in a uniform width of a fraction of an inch, forcing the outgoing incondensable gases to pass in close proximity and counter-current to the stream 63 on their way into enclosure 55 whence they are vented through pipe 65.

With an apparatus according to my invention the oxygen content of the incoming water is effectively reduced to as low as 0.001 p. p. m. when venting 0.05% or less of the steam supplied to the apparatus, a performance which has heretofore only been attainable with relatively large metallic vent condensers. Yet this outstanding performance is obtained with simple means. The width of annular openings 27 in Fig. 1 and 64 in Fig. 2 is so chosen as to provide the desired intimate counter-current contact between water and gaseous matter without, however, causing any appreciable loss in pressure. Excellent results have been obtained with annular openings one-quarter inch wide. The water leaving the spray valves 22 sprays into the body 45 of water on tray 30 without impinging on any metal surfaces on which it might deposit scale or which it might corrode. An apparatus in accordance with this invention is thus singularly free of maintenance difficulties.

While I believe that an arrangement providing conically shaped flow is most effective and convenient, good results can also be obtained by a flow which deviates from the shape of a cone, as by being more or less cylindrical, and I therefore desire such variations to be encompassed in the term "conically shaped flow" as used in the claims.

My invention may, of course, be adapted to apparatus in which the aeration of the water is combined with purification by precipitation, as for instance disclosed in the aforesaid Yoder patent. My invention may also be adapted to apparatus in which the final deaeration of the water is carried out by means different from those shown herein. Other modifications may be made without departing from the spirit of this invention and reference is, therefore, made to the appended claims for a definition of the scope of this invention.

What I claim is:

1. Water heating and deaerating apparatus comprising an enclosed tank, a water inlet pipe connected with said tank, a water outlet pipe connected with said tank, a steam inlet pipe connected with said tank, spraying means adapted to receive water from said water inlet pipe and having a conically shaped passage means for discharging said water downwardly in conically shaped flow, an enclosure in the upper portion of said tank enclosing said spraying means, aperture means in said enclosure co-axial with said conically shaped passage means and providing an annular opening of uniform width surrounding an imaginary extension of said conically shaped passage means, and a vent pipe connected with said enclosure.

2. Water heating and deaerating apparatus comprising an enclosed tank, a water inlet pipe connected with said tank, a water outlet pipe connected with said tank, a steam inlet pipe connected with said tank, means for maintaining a body of water in said tank, spraying means adapted to receive water from said water inlet pipe and having conically shaped passage means for discharging said water downwardly into said body of water in conically shaped flow, an enclosure in the upper portion of said tank enclosing said spraying means, aperture means in said enclosure co-axial with said conically shaped passage means and providing an annular opening of uniform width surrounding an imaginary extension of said conically shaped passage means, and a vent pipe connected with said enclosure.

3. Water heating and deaerating apparatus comprising an enclosed tank, a water inlet pipe connected with said tank, a water outlet pipe connected with said tank, a steam inlet pipe connected with said tank, a plurality of spray nozzles each adapted to receive water from said water inlet pipe and having a conically shaped passage for discharging said water downwardly in a conically shaped stream, an enclosure in the upper portion of said tank enclosing said spray nozzles, a plurality of apertures in said enclosure each of said apertures being co-axial with one of said conically shaped passages and providing an annular opening of uniform width surrounding an imaginary extension of said one of said conically shaped passages, and a vent pipe connected with said enclosure.

4. Water heating and deaerating apparatus comprising an enclosed tank, a water inlet pipe connected with said tank, a water outlet pipe connected with said tank, a steam inlet pipe connected with said tank, a plurality of spray nozzles each adapted to receive water from said water inlet pipe and having a conically shaped passage for discharging said water downwardly in a conically shaped stream, an enclosure located in the upper portion of said tank and having two parallel walls, said spray nozzles being mounted on one of said walls, a plurality of apertures in the other of said walls, each of said apertures being co-axial with one of said conically shaped passages and providing an annular opening of uniform width surrounding an imaginary extension of said one of said conically shaped passages, and a vent pipe connected with said enclosure.

5. Water heating and deaerating apparatus comprising an enclosed tank, a water inlet chamber mounted in said tank adjacent to its top, a dished bottom for said chamber, a water inlet pipe connected with said chamber, a water outlet pipe connected with said tank, a steam inlet pipe connected with said tank, a plurality of spray nozzles mounted on said dished bottom, each of said spray nozzles being adapted to receive water from said chamber and having a conically shaped passage for discharging said water downwardly in a conically shaped stream, an enclosure for said spray nozzles mounted on said chamber and having a dished bottom wall, a plurality of apertures in said dished bottom wall, each of said apertures being co-axial with one of said conically shaped passages and providing an annular opening of uniform width surrounding an imaginary extension of said one of said conically shaped passages, and a vent pipe connected with said enclosure.

6. The process of heating and deaerating water which comprises spraying water in conically shaped, downwardly directed flow, collecting said water and contacting it with steam supplied in such excess of the amount required to heat said water to substantially the steam temperature that dissolved gases are removed from said water, separating said excess steam from said water, condensing most of said excess steam by passing it counter-current to and in contact with said conically shaped flow of water in a uniformly wide flow less than one inch wide, surrounding said conically shaped flow, and venting incondensable gases together with the uncondensed remainder of said excess steam.

7. The process of heating and deaerating water which comprises spraying water in a plurality of conically shaped, downwardly directed streams, collecting said water and contacting it with steam supplied in such excess of the amount required to heat said water to substantially the steam temperature that dissolved gases are removed from said water, separating said excess steam from said water, condensing most of said excess steam by dividing it into a plurality of uniformly wide flows less than one inch wide and passing each of said flows counter-current to and in contact with and surrounding one of said conically shaped streams, and venting incondensable gases together with the uncondensed remainder of said excess steam.

8. The process of heating and deaerating water which comprises maintaining a body of water, spraying water in conically shaped, downwardly directed flow into said body, passing said water from said body into contact with steam supplied in such excess of the amount required to heat said water to substantially the steam temperature that dissolved gases are removed from said water, separating said excess steam from said water, condensing most of said excess steam by passing it counter-current to and in contact with said conically shaped flow of water in a uniformly wide flow less than one inch wide surrounding said conically shaped flow, and venting uncondensable gases together with the uncondensed remainder of said excess steam.

MARTIN E. GILWOOD.

References Cited in the file of this patent

UNITED STATES PATENTS

| Number | Name | Date |
|---|---|---|
| 2,379,753 | Sebald | July 3, 1945 |
| 2,500,774 | Sebald | Mar. 14, 1950 |
| 2,564,584 | Sebald | Aug. 14, 1951 |

FOREIGN PATENTS

| Number | Country | Date |
|---|---|---|
| 638,198 | Great Britain | May 31, 1950 |